(12) United States Patent
Struhsaker et al.

(10) Patent No.: US 10,075,813 B1
(45) Date of Patent: Sep. 11, 2018

(54) METHOD AND SYSTEM FOR MONITORING A MOBILE ASSET

(71) Applicant: TIONESTA, LLC, San Antonio, TX (US)

(72) Inventors: Paul Struhsaker, San Antonio, TX (US); Nicholas Cianos, San Antonio, TX (US); Chenchen Jimmy Li, San Antonio, TX (US)

(73) Assignee: TIONESTA, LLC, San Antonio, TX (US)

( * ) Notice: Subject to any disclaimer, the term of this patent is extended or adjusted under 35 U.S.C. 154(b) by 0 days.

(21) Appl. No.: 15/799,299

(22) Filed: Oct. 31, 2017

(51) Int. Cl.
*H04W 4/02* (2018.01)
*H04L 29/08* (2006.01)
*H04B 17/318* (2015.01)
*H04W 56/00* (2009.01)
*G01S 5/02* (2010.01)
*H04L 12/26* (2006.01)
*G01S 19/13* (2010.01)
*H04W 84/18* (2009.01)

(52) U.S. Cl.
CPC .......... *H04W 4/023* (2013.01); *G01S 5/0268* (2013.01); *H04B 17/318* (2015.01); *H04L 43/106* (2013.01); *H04L 67/12* (2013.01); *H04W 56/001* (2013.01); *G01S 19/13* (2013.01); *H04W 84/18* (2013.01)

(58) Field of Classification Search
CPC ......... H04W 4/02; H04W 4/04; H04W 4/043; H04W 4/024; H04W 4/046; H04W 4/029; H04W 48/04; H04W 28/021; H04W 84/18; H04W 84/20; H04W 56/00; H04W 56/0095; H04W 56/0005; H04W 4/80; H04W 56/0015; H04W 56/002; H04W 56/0065; H04W 4/38; G01S 5/02; G01S 5/021; G01S 5/0242; G01S 5/0294; G01S 19/25; G01S 19/26; A01K 11/00; G08B 13/2462; H04Q 2209/10; H04Q 2209/20; H04Q 2209/25; H04Q 2209/40; H04Q 2209/43; H04Q 2209/50; H04Q 2209/75; H04Q 2209/753; H04B 17/318
See application file for complete search history.

(56) References Cited

U.S. PATENT DOCUMENTS

| | | | |
|---|---|---|---|
| 2015/0032418 A1* | 1/2015 | Akiyama | G07C 5/085 |
| | | | 702/190 |
| 2015/0163626 A1* | 6/2015 | Zimmer | H04W 4/90 |
| | | | 455/404.2 |
| 2016/0286488 A1* | 9/2016 | Simon | H04W 52/0216 |
| 2017/0140645 A1* | 5/2017 | Balid | G08G 1/0116 |
| 2017/0273054 A1* | 9/2017 | Beitler | G01S 5/04 |
| 2017/0280279 A1* | 9/2017 | Ghosh | H04W 64/00 |
| 2017/0288447 A1* | 10/2017 | Guibene | H02J 7/025 |

\* cited by examiner

*Primary Examiner* — Meless Zewdu
(74) *Attorney, Agent, or Firm* — Osha Liang LLP

(57) ABSTRACT

A network node for monitoring a mobile asset in a geographical area. The network node is among a number of network nodes disposed in the geographical area that are configured to receive an Internet-of-things (IoT) signal from the mobile asset, and send respective time stamps, each representing a time-of-arrival (TOA) of the IoT signal, to a network aggregation system to generate a time-difference-of-arrival (TDOA) from which a geolocation of the mobile asset is generated.

30 Claims, 11 Drawing Sheets

# METHOD AND SYSTEM FOR MONITORING A MOBILE ASSET

BACKGROUND

Availability of the status of various physical assets can be beneficial or even essential. For example, it may be useful to track the location of moving items or persons, for various reasons such as to provide security, to optimize certain operations, e.g., in industrial environments or logistic applications, and/or to provide useful instructions to a tracked person. Further, monitoring stationary objects may also be useful. Such a stationary object may be, for example, a sensor that can be queried to obtain information about the environment surrounding the sensor.

SUMMARY

In general, in one aspect, the invention relates to a network node for monitoring a mobile asset in a geographical area. The network node includes an Internet-of-things (IoT) receiver configured to receive an IoT signal from a tag sensor disposed on the mobile asset, a time-of-arrival (TOA) module coupled to the IoT receiver and configured to generate a time stamp representing a TOA of the IoT signal as received by the TOA module, and a processing engine coupled to the IoT receiver and the TOA module and configured to extract an RSSI data item embedded in the IoT signal, and transmit the time stamp and the RSSI data item, wherein the network node is one of a plurality of network nodes disposed in the geographical area, the plurality of network nodes being configured to receive the IoT signal from the mobile asset, and send a plurality of time stamps, including the time stamp, generated by the plurality of network nodes based on the IoT signal to a network aggregation system, wherein a time-difference-of-arrival (TDOA) is generated based on the plurality of time stamps, wherein a geolocation of the mobile asset is obtained based at least on the TDOA, and wherein the geolocation is qualified using at least the RSSI data item.

In general, in one aspect, the invention relates to a network aggregation system for monitoring a mobile asset in a geographical area. The network aggregation system includes a computer processor and memory storing instructions, when executed, causing the computer processor to receive, from a plurality of network nodes disposed about the geographical area to receive an Internet-of-things (IoT) signal from a tag sensor disposed on the mobile asset, a plurality of time stamps each representing a time-of-arrival (TOA) of the IoT signal as received by a corresponding one of the plurality of network nodes, generate a time-difference-of-arrival (TDOA) based on the plurality of time stamps, and generate a geolocation of the mobile asset based at least on the TDOA, wherein a network node of the plurality of network nodes is configured to receive the IoT signal from the tag sensor, generate a time stamp of the plurality of time stamps for the IoT signal, extract an received-signal-strength-indication (RSSI) data item embedded in the IoT signal, and send the time stamp and the RSSI data item to the network aggregation system, and wherein the geolocation is qualified using at least the RSSI data item.

In general, in one aspect, the invention relates to a method for monitoring a mobile asset in a geographical area. The method includes receiving, by a network node of a plurality of network nodes disposed within the geographical area to receive an Internet-of-things (IoT) signal, the IoT signal from a tag sensor disposed on the mobile asset, generating, by the network node, a time stamp of the IoT signal among a plurality of time stamps generated by the plurality of network nodes based on the IoT signal, extracting, by the network node, a received-signal-strength-indication (RSSI) data item embedded in the IoT signal, and sending, by the plurality of network nodes, the plurality of time stamps and at least the RSSI data item to a network aggregation system, wherein a time-difference-of-arrival (TDOA) is generated based on the plurality of time stamps, wherein a geolocation of the mobile asset is obtained based at least on the TDOA, and wherein the geolocation is qualified using at least the RSSI data item.

Other aspects of the invention will be apparent from the following description and the appended claims.

DETAILED DESCRIPTION

Figure 1A:
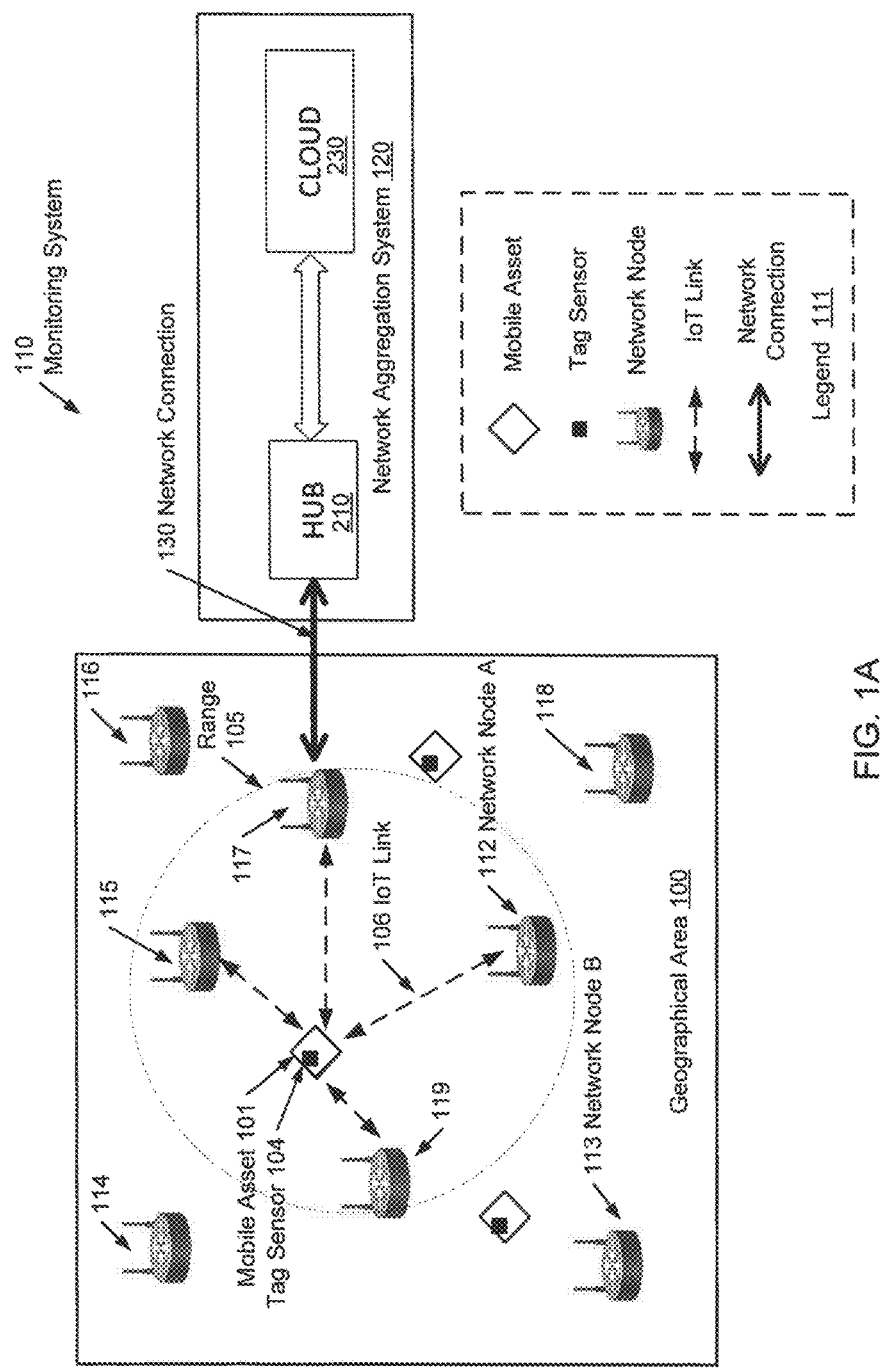
FIG. 1A shows a system for monitoring a mobile asset, in accordance with one or more embodiments of the invention.

Specific embodiments of the invention will now be described in detail with reference to the accompanying figures. Like elements in the various figures are denoted by like reference numerals for consistency. Like elements may not be labeled in all figures for the sake of simplicity.

In the following detailed description of embodiments of the invention, numerous specific details are set forth in order to provide a more thorough understanding of the invention. However, it will be apparent to one of ordinary skill in the art that the invention may be practiced without these specific details, In other instances, well-known features have not been described in detail to avoid unnecessarily complicating the description.

Throughout the application, ordinal numbers (e.g., first, second, third, etc) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to he understood that the singular forms "a," "an," and "the" include plural referents unless the context clearly dictates otherwise. Thus, example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that, one or more of the steps shown in the flowcharts may be omitted, repeated, and/or performed in a different order than the order shown. Accordingly, the scope of the invention should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In general, embodiments of the invention are directed to methods and systems for monitoring a mobile asset in a geographical area. In one or more embodiments of the invention, the mobile asset is tagged with a sensor (referred to as a tag sensor) while a number of network nodes (e.g., gateway, access point, etc.) are disposed about the geographical area to receive an Internet-of-things (IoT) signal from the tag sensor. Each network node is configured to generate a time-of-arrival (TOA) time stamp upon receiving the IoT signal and to extract an received-signal-strength-indication (RSSI) data item embedded in the IoT signal. The TOA time stamp and the RSSI data item device generated/extracted by each network node are sent to a network aggregation system. In response, the network aggregation system generates a time-difference-of-arrival (TDOA) based on the time stamps received from the network nodes and generates a geolocation of the mobile asset based at least on the TDOA. In one or more embodiments, the geolocation is qualified using at least the RSSI data item. In one or more embodiments, multiple mobile assets in the geographical area are monitored individually and simultaneously.

In one or more embodiments of the invention, the monitoring system includes IoT access points connected to a primary access point that is in turn connected to a network aggregation system including a HUB-Cloud having a TDOA processing element. The access points have overlapping IoT radio coverage such that the IoT signal transmitted from any given tag sensor may be received by at least three (3) or more access points. The location of each IoT access point is pre-determined and all access points are time synchronized. For example, the pre-determined locations and synchronization of the access points may be implemented using a global positioning system (GPS) installed in each access point. In another example, the location of each access point may be recorded at time of set up and other synchronization methods may also be used.

FIG. 1A. shows a monitoring system (110) for monitoring one or more mobile assets in a geographical area (100) in accordance with one or more embodiments of the invention. In one or more embodiments, one or more of the modules and elements shown in FIG. 1A may be omitted, repeated, and/or substituted. Accordingly, embodiments of the invention should not be considered limited to the specific arrangements of modules shown in FIG. 1A.

As shown in FIG. 1A, depicted according to the legend (111), the monitoring system (110) includes a number of network nodes (e.g., network node A (112), network node B (113), network nodes (114-119)) disposed about the geographical area (100) and in communication with a network aggregation system (120). In one or more embodiments of the invention, the network nodes (e.g., network node A (112), network node B (113), network nodes (114-119)) are stationery within the geographical area (100). For example, the network nodes may be placed at respective stationery locations within the geographical area (100) at time of deployment and remain at the deployed known locations unless subsequently re-deployed. In one or more embodiments of the invention, the mobile assets (e.g., mobile asset (101)) may include livestock, mobile mining equipment, human subjects, vehicles, agriculture, oil and gas assets such as tanks, or any other valuable mobile objects that may move from time to time within the geographical area (100). Correspondingly, the geographical area (100) may include a ranch, a mining field, a playground, a dealership lot or port, a refinery, or any other suitable public or private space in which assets are mobile and may be tracked.

In one or more embodiments, each mobile asset (e.g., mobile asset (101)) is equipped with a tag sensor (e.g., tag sensor (104)) that communicates with multiple network nodes (e.g., network node A (112)) via Internet of Things (IoT) links (e.g., IoT link (106)) to enable monitoring of the mobile assets (e.g., mobile asset (101)). For example, the tag sensor (104) may measure physiological parameters of the mobile asset (101) for sending to nearby network nodes (e.g., network node A (112)) using the IoT links (e.g., IoT link (106)). In one or more embodiments, each IoT link (e.g., IoT link (106)) is established and/or effective within certain range of a tag sensor (e.g., range (105) of tag sensor (104)). For example, four IoT links (e.g., IoT link (106)) are shown as established between the tag sensor (104) and four network nodes (e.g., network node A (112)). In contrast, other network nodes (e.g., network node B (113)) outside of the range (105) of the tag sensor (104) are not in communication with the tag sensor (104) using any IoT link. For example, no IoT link is established between the tag sensor (104) and the network node B (113). From time to time, the range (105) may vary depending on various conditions such as location of the mobile asset (101), weather/terrain of the geographical area (100), battery charge of the tag sensor (104), etc. For example, the range (105) may vary at certain time points such that the network node A (112) falls outside of the range (105). During these time points, only three IoT links remain established and/or effective between the tag sensor (104) and the remaining three network nodes.

In one or more embodiments, the network nodes (e.g., network node A (112), network node B (113), network nodes (114-119)) disposed about the geographic area (100) communicate with each other via a wireless network. For example, the distance between the network nodes (e.g, network node A (112), network node B (113), network nodes (114-119)) may be on the order of 1 kilometer (km) and may vary with the nature of terrain in the geographic area (200). The wireless network may be based on the WiFi communication spectrum at 2.4 GHz and 5 GHz. For example, 802.11S standard may be used to allow the network nodes (e.g, network node A (112), network node B (113), network nodes (114-119)) to communicate with each other as a full meshed network. The meshed network enables communications based on the availability of any network node (e.g., network node A (112), network node B (113), network nodes (114-119)) to pass a signal through the network to its destination, such as from the network node A (112) to the network aggregation system (120). In one or more embodiments, the meshed network across the geographical area (100), or a portion thereof, is connected to the network aggregation system (120) via a primary network node to reduce communication bandwidth demand to the network aggregation system (120). For example, the primary network node may aggregate data transmissions from the meshed network before passing on to the network aggregation system (120). As shown in FIG. 1A, the network node (117) acts as the primary network node for the meshed network deployed across the geographical area (100). In addition to or in place of the 802.11S standard, any communication technology supporting full meshed networking may also be used.

In one or more embodiments, one or more network nodes (e.g., network node A (112), network node B (113), network nodes (114-119)) may be configured as a gateway, a wireless access point, or a combination thereof. The gateway is a network node for interfacing with another network that uses different protocols. The wireless access point, or generally referred to as the access point, is a networking device that allows WiFi connection to a computer or communication network. Further details of the network nodes (e.g., network node A (112)) are described in reference to FIGS. 2A-2B below.

In one or more embodiments of the invention, the network nodes (e.g., network node A (112)) and the network aggregation system (120) described above collectively perform the functionalities of the monitoring system (110) using the method described in reference to FIGS. 4A-4D below.

Figure 1B:
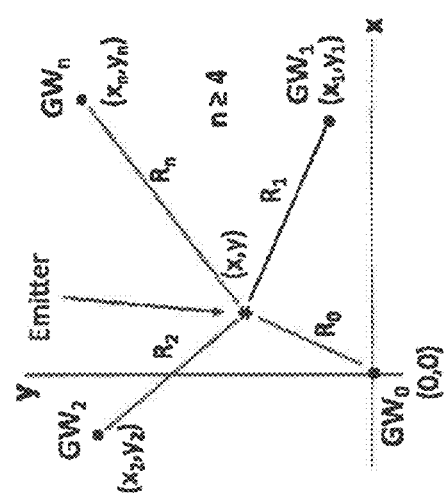
FIGS. 1B, 1C, and 1D show a model for monitoring a mobile asset, in accordance with one or more embodiments of the invention.
Figure 1C:
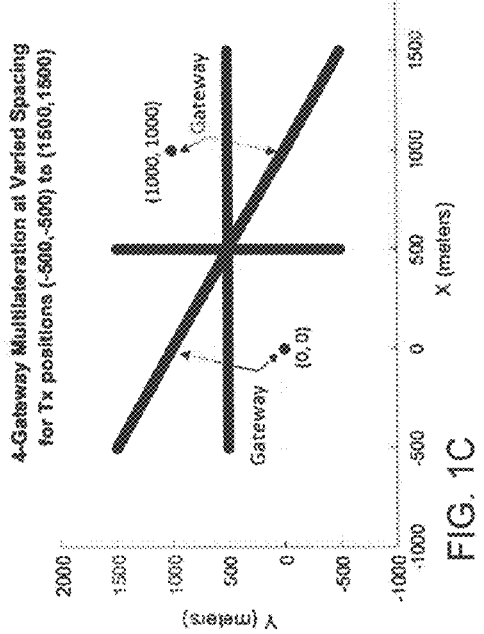
Figure 1D:
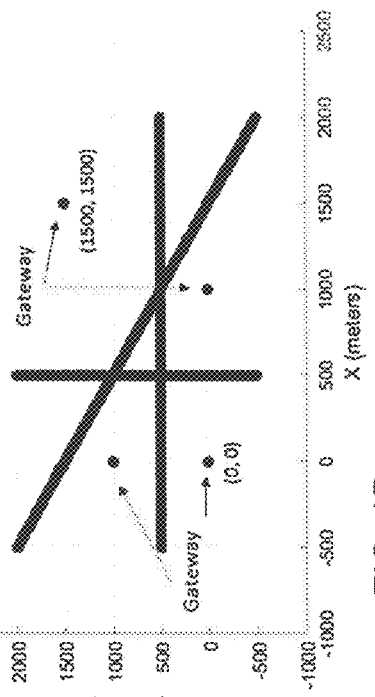

FIGS. 1B, 1C, and 1D show a model for a TDOA localization technique, in accordance with one or more embodiments of the invention. As shown in FIGS. 1B, 1C, and 1D, gateways are used to represent the network nodes depicted in FIG. 1A above. Specifically, FIG. 1B shows four gateways in an x-y plane, denoted as $GW_0$, $GW_1$, $GW_2$, and $GW_n$, to represent the four network nodes (e.g., network nodes A (112)) within the range (105), as shown in FIG. 1A above. The model described below is based on placing $GW_0$ at the origin, (0,0), of the x-y coordinate system. The other gateways, $GW_1$, $GW_2$, through $GW_n$, may be located in respective known locations $(x_1, y_1)$, $(x_2, y_2)$, ... $(x_n, y_n)$. As an example, the distance between the gateways may be nominally 1 to 2 kilometers, In one or more embodiments, the gateways, $GW_0$ through $GW_n$ are stationery. In other words, the known locations $(0,0)$, $(x_1, y_1)$, $(x_2, y_2)$, ... $(x_n, y_n)$ do not change with time. In one or more embodiments, the gateways, $GW_0$ through $GW_n$ may change locations. For example, the known locations $(x_1, y_1)$, $(x_2, y_2)$, ... $(x_n, y_n)$ may be determined using GPS included in each gateway.

The emitter depicted in FIG. 1B represents the tag sensor (104) depicted in FIG. 1A above and has a particular location, (x,y), with the distances between the emitter and the corresponding gateways denoted as $R_0$, $R_1$, $R_2$ and $R_3$.

The distance between the Gateway j and the emitter is $$R_j = \sqrt[2]{(x_j - x)^2 + (y_j - y)^2}$$

for j=0,1,2 ... n where n≥4
Note that for j=0, $$R_0 = \sqrt[2]{x^2 + y^2}$$

since the gateway is located at the origin of the coordinate system.

Now square $R_j$ and expand the terms within the radical to obtain:

$$R_j^2 = x_j^2 - 2x_j x + x^2 + y_j^2 - 2y_j y + y^2$$

Since $R_0^2 = x^2 + y^2$, $R_0^2$ may be subtracted from each side of the above expression and obtain:

$$R_j^2 - R_0^2 = x_j^2 - 2x_j x + y_j^2 - 2y_j y \qquad \text{Equation 1}$$

Note that this expression is now linear x and y. This linearity is used to develop a pair of simultaneous equations in two unknowns, x and y. In this context, the model described herein may be referred to as a linear algebraic model.

The transmitted signal travels from the emitter (i.e., tag sensor (104)) to each gateway at the speed of light, c=3×$10^8$ m/sec. The corresponding time-of-arrival, TOA, at each gateway is:

$$T_j = R_j/c$$

Use the TOA, $T_0$, of the gateway at the origin as a reference and take the difference with TOAs of the remaining gateways and the reference to generate time-difference-of-arrivals, $T_j$:

$$T_j = T_j - T_0 = R_j/c - R_0/c$$

Solve for $R_j$ and square it to obtain:

$$R_j^2 = (cT_j)^2 + 2cT_j R_0 + R_0^2 \text{ or}$$

$$(R_j^2 - R_0^2)/cT_j = cT_j + 2R_0$$

For j=1,2 ... n, the $2R_0$ may be eliminated by taking the following differences and expressing the differences relative to the TDOAs or:

$$(R_2^2 - R_0^2)/cT_2 - (R_1^2 - R_0^2)/cT_1 = cT_2 - cT_1$$

$$(R_n^2 - R_0^2)/cT_n - (R_1^2 - R_0^2)/cT_1 = cT_n - cT_1$$

Use Equation 1 above and substitute the corresponding values of x's and y's terms for $(R_1^2 - R_0^2)$, $(R_2^2 - R_0^2)$ through $(R_n^2 - R_0^2)$, then collect the terms to form n-1 equations that are linear in x and y:

$$A_2 x + B_2 y = D_2$$

$$A_n x + B_n y = D_n$$

where $$A_2 = -\frac{2x_2}{cT_2} + \frac{2x_1}{cT_1}$$

$$A_n = -\frac{2x_n}{c\tau_n} + \frac{2x_1}{c\tau_1}$$

$$B_2 = -\frac{2y_2}{c\tau_2} + \frac{2y_1}{c\tau_1}$$

$$\vdots$$

$$B_n = -\frac{2y_n}{c\tau_n} + \frac{2y_1}{c\tau_1}$$

$$D_2 = c\tau_2 - c\tau_1 - \frac{x_2^2 + y_2^2}{c\tau_2} + \frac{x_1^2 + y_1^2}{c\tau_1}$$

$$\vdots$$

$$D_n = c\tau_n - c\tau_1 - \frac{x_n^2 + y_n^2}{c\tau_n} + \frac{x_1^2 + y_1^2}{c\tau_1}$$

Express the n−1 equations above in a matrix format:

$$(AB)\begin{pmatrix}x\\y\end{pmatrix} = (D) \quad \text{Equation 2}$$

where $$(AB) = \begin{pmatrix}A_2 & B_2\\ \vdots & \vdots\\ A_n & B_n\end{pmatrix}$$

and $$(D) = \begin{pmatrix}D_2\\ \vdots\\ D_n\end{pmatrix}$$

Equation 2 be solved for x and v (i.e., coordinates for the location of the emitter or tag sensor (104), as a function of known gateway locations, using a pseudoinverse matrix approach which is similar to a least squares solution:

$$\begin{pmatrix}x\\y\end{pmatrix} = inv((AB)^T(AB)) * (AB)^T * (D)$$

where $(AB)^T$ is the transpose of (AB).

The simultaneous equations above may exhibit a singularity if an emitter is located along a line that bisects the baseline between a pair of gateways. The singularity is a result of the distances between the emitter on the bisector and the pair of gateways being equal. FIGS. 1C and 1D show how the singularities vary with gateway locations. FIG. 1C has gateway locations at the corners of a 1 kilometer square. The darkened lines show the locations of the singularities. In other words, each point on the darkened lines corresponds to a singularity. Note that a singularity does not appear along a line that goes through the origin and the gateway located at (1000, 1000) meters since the algebraic approach uses the origin as the reference for all of the time difference. FIG. 1D shows how the singularities associated with the diagonally slopped line changes as the one gateway was moved to a different location (1500, 1500).

Generally, the issue caused by the singularity is a low probability event. If more than four gateways receive the IoT signal from the emitter or tag sensor (104), using different combinations of receiving geometries mitigates the likelihood of a singularity. The use of TOA and RSSI measurements in combination allows for selecting which of the four gateways are used to geolocate an emitter without being influenced by any singularity.

Figure 2:
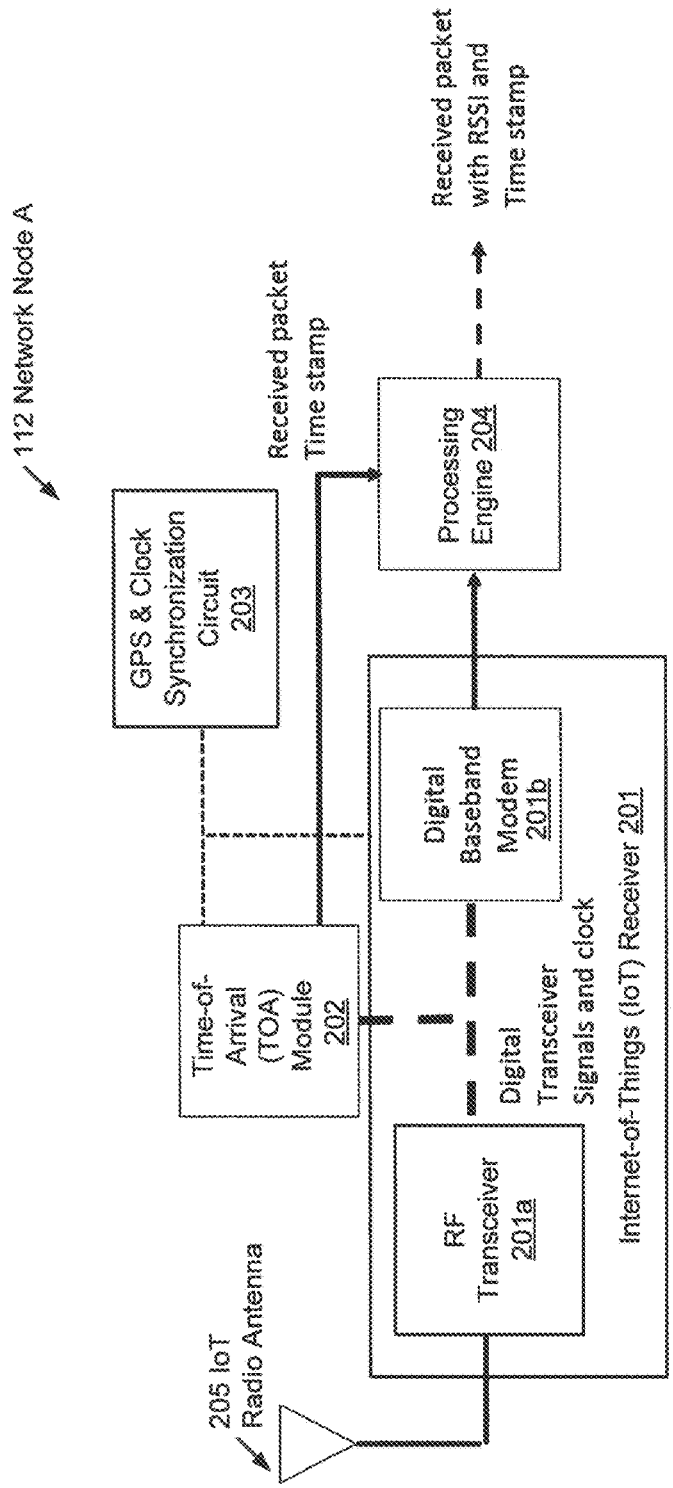
FIGS. 2 and 3 show a network node and communication protocol overlay for monitoring a mobile asset, in accordance with one or more embodiments of the invention.

FIG. 2 shows a network node for monitoring one or more mobile assets in a geographical area in accordance with one or more embodiments of the invention. In one or more embodiments, one or more of the modules and elements shown in FIG. 2 may be omitted, repeated, and/or substituted. Accordingly, embodiments of the invention should not be considered limited to the specific arrangements of modules shown in FIG. 2.

As shown in FIG. 2, the network node A (112) includes an Internet-of-things (IoT) receiver (201), a time-of-arrival (TOA) module (202), a global positioning service (GPS) & clock synchronization circuit (203), a processing engine (204), and an IoT radio antenna (205). Each of the modules and elements of the network node A (112) may include a hardware component, a software component, or a combination of hardware and software components that performs the function of the network node A (112). In one or more embodiments, the IoT receiver (201) is configured to receive an IoT signal from a tag sensor disposed on a mobile asset, such as the tag sensor (104) of the mobile asset (101) depicted in FIG. 1A above. The IoT receiver (201) includes an RF receiver (201a) to receive the IoT signal via the IoT radio antenna (205), and a digital baseband modem (201b) to demodulate or otherwise convert the received IoT signal into a digitized signal having a preamble and a payload. The preamble includes metadata of the payload information, such as identifying information of the tag sensor, transmission time stamp of the IoT signal, etc. The payload includes information generated by the tag sensor, such as physiological measurements of the mobile asset, GPS position of the tag sensor, etc. For example, the IoT receiver (201) may be based on the LoRA protocol or other types of IoT protocols. In other words, the RF receiver (201a) is a radio frequency receiver configured to receive the LoRA or other types of IoT signal. The digital baseband modem (201b) is a modulator/demodulator circuit configured to process the LoRA or other types of IoT signal.

In one or more embodiments, the received IoT signal is detected by the TOA module (202) to generate a TOA time stamp without demodulating or otherwise decoding the waveform of the IoT signal. In one or more embodiments, the received IoT signal is detected by the TOA module (202) to generate the TOA time stamp based on the preamble without decoding the payload of the IoT signal. The TOA time stamp is a numerical value representing the time when the IoT signal is detected by the TOA module (202). In one or more embodiments, the TOA module (202) generates the TOA time stamp based on a high precision and stable internal clock. In one or more embodiments, the internal clock is calibrated by and synchronized to a 1 PPS (pulse-per-second) time mark from the GPS & clock synchronization circuit (203). For example, a temperature stabilized disciplined oscillator at 32 MHz with less than 10 ns RMS (root-mean-squared) jitter may be used to supply the internal clock. In another example, the 1 PPS time mark may be provided to a phased lock loop (PLL) circuit which generates 32 MHz frequency with less than 10 ns of RMS jitter, In on or more embodiments, the processing engine (204) is configured to decode the converted IoT signal that includes sensor measurements generated by the tag sensor, GPS position of the tag sensor, and signal statistics such as received signal strength indication (RSSI). The processing engine (204) is further configured to send the decoded IoT payload information and RSSI along with the TOA time stamp information through the meshed network to the network aggregation system (120) depicted in FIG. 1A above.

In on or more embodiments, the processing engine (204) is further configured to support the generation and transmission of simulated IoT signals. The simulated IoT signal is a signal conforming to the same protocol as the IoT signal from the tag sensors (e.g., tag sensor (104)). In contrast to the IoT signal, the simulated IoT signal is generated by a network node (e.g., network node A (112)) using associated processing engine (e.g., processing engine (204)) instead of being generated by any tag sensor. In one or more embodiments, the simulated IoT signal of the network node A (112) includes a GPS position of the network node A (112) such that the network node A (112) acts as a simulated mobile asset for diagnostic testing and calibration of the monitoring network (110). As used herein, a simulated mobile asset is a network node that generates and transmits a simulated IoT signal to act as a mobile asset having a tag sensor transmitting a real IoT signal.

In on or more embodiments, the GPS & clock synchronization circuit (203) includes a GPS unit serving at least two functions. The GPS unit provides a long-term and accurate measurement of geo-position of the network node A (112). This measured geo-position does not require the network node A (112) to be located precisely during the deployment of the monitoring network (110). Secondly, the GPS signal provides the 1 PPS timing reference that synchronizes internal clocks in the network nodes (e.g., network node A (112), network node B (113), network nodes (114-119)) throughout the monitoring network (110). The internal clock is used to generate the TOA time stamps noted above. Synchronization of the network node internal clocks throughout the monitoring network (110) allows the TOA time stamps generated by different network nodes (e.g., network node A (112), network node B (113), network nodes (114-119)) to be compared on a synchronized or otherwise consistent basis.

In on or more embodiments, the GPS & clock synchronization circuit (203) further includes a signal conditioning circuit that synchronizes the GPS 1 PPS timing pulse with a stable internal clock of the network node A (112). This stable internal clock is used by the TOA module (202) to generate the TOA time stamp. It is sufficiently stable that during times that the GPS signal may not be available, this internal clock continues to provide synchronized timing to generate the TOA time stamps.

In one or more embodiments of the invention, the components of the network node A (112) described above collectively perform the functionalities of the monitoring system (110) using the method described in reference to FIGS. 4A-4D below.

Figure 3:
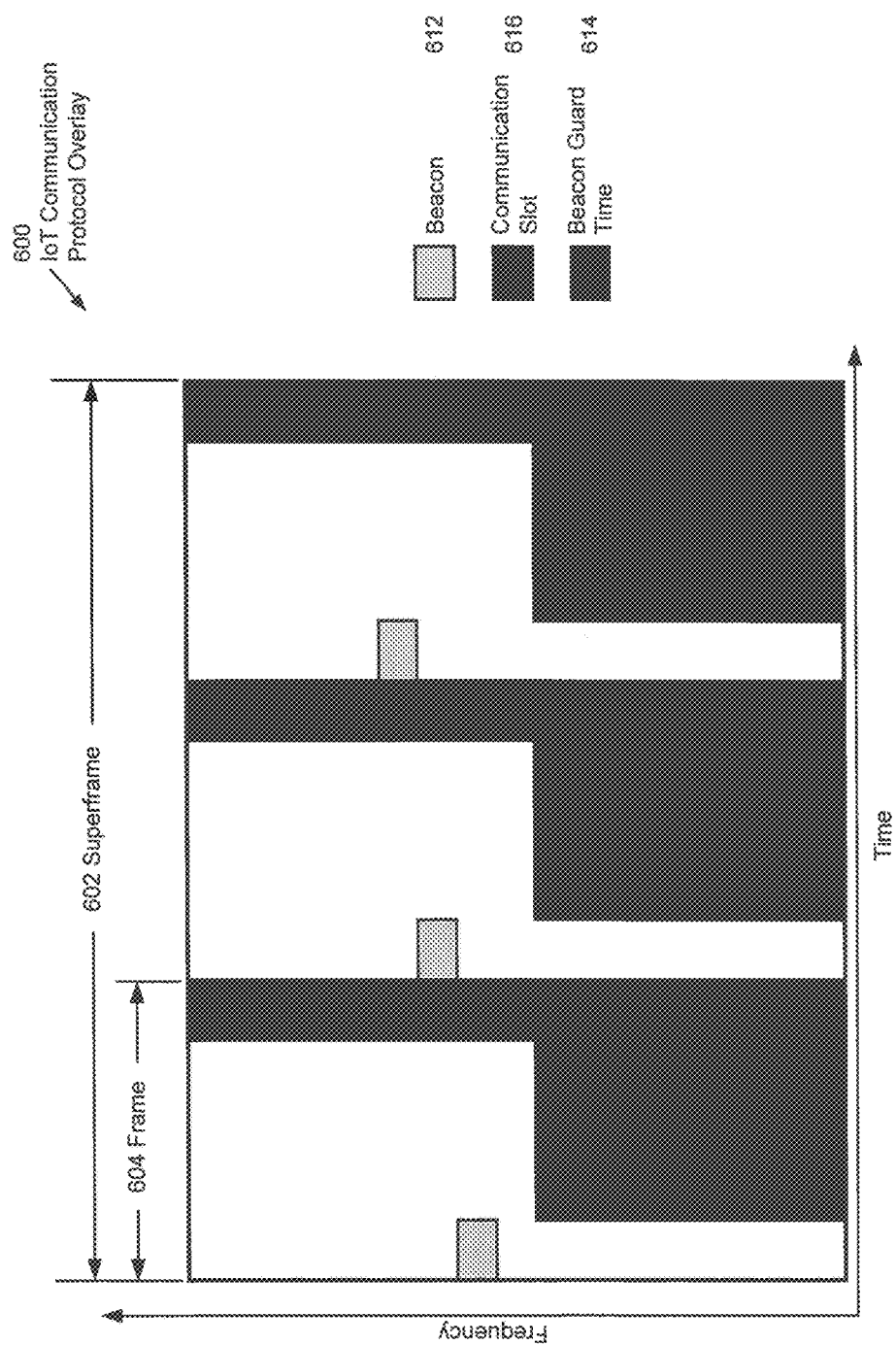

FIG. 3 shows an IoT communication protocol overlay for monitoring one or more mobile assets in a geographical area in accordance with one or more embodiments of the invention. In one or more embodiments, one or more of the modules and elements shown in FIG. 3 may be omitted, repeated, and/or substituted. Accordingly, embodiments of the invention should not be considered limited to the specific arrangements of modules shown in FIG. 3.

As shown in FIG. 3, the IoT communication protocol overlay is designed to enable the distribution of an accurate time base by an access point (e.g., network node A (112) depicted in FIGS. 1 and 2A above) to tag sensors or other devices communicating with the access point. The IoT communication protocol overlay further establishes rules for data exchanges in the form of frequency bands and time slots to be used for communications, to reduce or eliminate collisions that may otherwise occur when multiple tag sensors attempt to simultaneously transmit data. In one or more embodiments, the aforementioned IoT signal and simulated IoT signal are based on the IoT communication protocol overlay described herein.

In one or more embodiments of the invention, the IoT communication protocol overlay may be used to extend existing IoT protocols such as LoRa or SigFox, but also other protocols such as the 802.11 Wi-Fi protocol. FIG. 3 shows an IoT communication protocol overlay (600) in which a superframe (602) and frames (604) are established. The beginning of each frame is marked by a beacon (612), emitted by the access point. A beacon may include or may be followed by a communication of various data to the IoT devices within the range of the access point. The data may include a precise time base that the access point may have obtained from its GPS unit. The data may further include a specification of the IoT communication protocol overlay, thus informing the IoT devices that are supposed to communicate with the access point of the timing and frequency of time slots assigned to them for data transmission.

The beacon may then be followed by transmissions of sensor data in the communication slots (616). Each communication slot may be of a fixed duration and may be located at a set frequency. In the exemplary IoT communication protocol overlay (600) of FIG. 3, a frame includes 24 communication slots. Groups of 8 communication slots may be simultaneously transmitted using different frequencies. Communication slots may be assigned in any way. For example, a communication by a particular IoT device may be performed using a single assigned communication slot or, it necessary, multiple communication slots that may occur in parallel at different frequencies (channels) and/or subsequently. No communication slot may be assigned to multiple devices to prevent communication collisions. A frame (x04) ends with a beacon guard time (x14), during which no communications by any of the IoT devices that rely on the IoT communication protocol overlay may be allowed. However, other IoT devices that are merely capable of communicating using the underlying IoT communication protocol, but not the IoT communication protocol overlay, may communicate during the beacon guard time.

In total, the IoT communication protocol overlay (600) provides 72 communication slots (616). Accordingly, up to 72 individual communications may be performed in a single superframe (602). If these 72 communications are insufficient to serve all IoT devices, the protocol overlay may be modified in various ways without departing from the invention. For example, a superframe may be configured to include more than three frames. Additionally or alternatively, a frame may include more than three consecutive communication slots, and/or additional frequencies (channels) may be used to allow simultaneous transmission of additional communication slots. The same IoT communication protocol overlay may be used by all access points across a site.

In one or more embodiments of the invention, not all channels that are available in the underlying IoT communication protocol are used by the IoT communication protocol overlay. Channels that are not made available may he used to support devices that are not designed to work with the IoT communication protocol overlay, while being able to use the underlying IoT protocols. Such channels may also be used for lengthy transmissions such as a firmware provided over the air.

Returning to the discussion of FIG. 1A, in one or more embodiments, the network nodes (e.g., network node A (112)) interface with a network aggregation system (120), which performs processing of the data received from the monitored mobile assets (e.g., mobile asset (101)) via the network nodes (e.g., network node A (112), network node B (113), network nodes (114-119)). For example, the network aggregation system (120) may process the received data to determine location, behavior, and/or physiology of each mobile asset (e.g., mobile asset (101)), as further described below.

In one or more embodiments of the invention, the network aggregation system (120) includes a processing hub (210) and an information cloud (230). The hub (210) and cloud (230) collectively aggregate the TOA time stamps from multiple network nodes (e.g., network node A (112)) to geolocate the mobile asset tagged with the tag sensor based on time-difference-of-arrival (TDOA) techniques, such as the linear algebraic model described in reference to FIGS. 1B-1D above. Note that the TOA time stamps from a minimum of three network nodes may be used to geolocate a tag sensor emitting the IoT signal. The TOA time stamps from four or more network nodes is preferred to enable the use of the aforementioned linear algebraic model to calculate the tag sensor location.

In one or more embodiments, the hub (210) interfaces with computing devices in the cloud (230) via a wired backhaul uplink, a cellular backhaul uplink and/or a satellite backhaul uplink of the Internet. The hub (210), includes a computing device configured to perform at least some of the steps described with reference to the flowcharts of FIGS. 4A-4D, and one or more communication interfaces that enable the hub to interface with one or more access points (e.g., network node A (112), network node B (113), network nodes (114-119)), the cloud (230), and a user computing device that executes a user application. The computing device of the hub may be, for example, an embedded system that includes all components of the computing device on a single printed circuit board (PCB), or a system on a chip (SOC), i.e., an integrated circuit (IC) that integrates all components of the computing device into a single chip. The computing device may include one or more processor cores, associated memory (e.g., random access memory (RAM), cache memory, flash memory, etc.), one or more network interfaces (e.g., an Ethernet interface, a Wi-Fi interface, a Bluetooth interface, etc.), and interfaces to storage devices, input and output devices, etc. The computing device may further include one or more storage device(s) (e.g., a hard disk, an optical drive such as a compact disk (CD) drive or digital versatile disk (DVD) drive, flash memory, etc.), and numerous other elements and functionalities. In one embodiment of the invention, the computing device includes an operating system that may include functionality to execute the methods further described below. Those skilled in the art will appreciate that the invention is not limited to the aforementioned configuration of the computing device.

Figure 6:
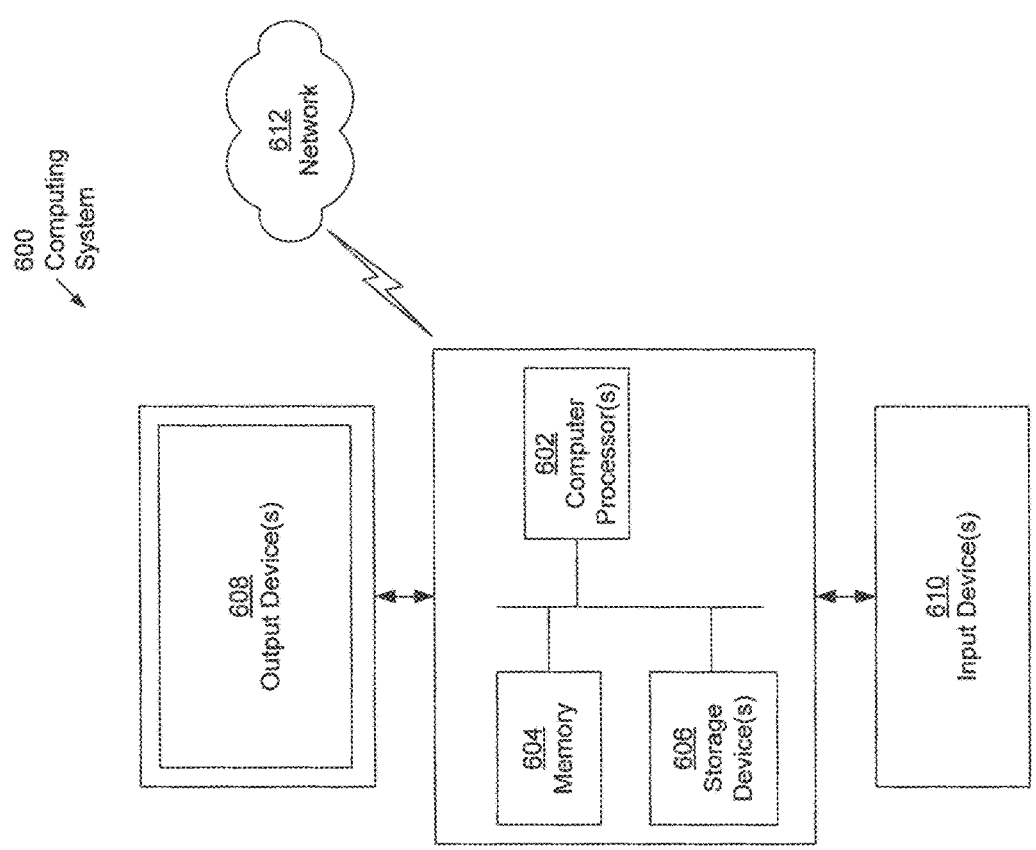
FIG. 6 shows a computing system in accordance with one or more embodiments of the invention.

The cloud (230), in accordance with one or more embodiments of the invention, may be formed by multiple/many networked computing devices. These computing devices may be geographically and organizationally distributed in any way. For example, some of these computing devices may be located in a data center, whereas other such computing devices may be individual physical or virtual servers. An exemplary computing system, as it may be used in the cloud, is shown in FIG. 6. While functionalities of the network aggregation system (110) that are performed on the hub (210) and that are performed on a computing device in the cloud (230) may be performed separately, the hub (210) and cloud (230) are interconnected, e.g., via the backhaul link, thus enabling synchronization between functionalities performed on the hub (210) and functionalities performed on a computing device in the cloud (230). Accordingly, the same information may be available, regardless of whether a user application connects via the hub (210) or via the cloud (230). Temporary discrepancies may exist though, e.g., during times when a backhaul link is interrupted, and a synchronization is therefore unavailable. Further, because additional, e.g., more complex, data processing may be performed in the cloud, additional data, resulting from the additional processing, may be available when connecting to the cloud. Such data may, however, also he available via the hub (210), if they are synchronized to the hub (210) via the backhaul link.

Those skilled in the art will recognize that other configurations that deviate from the hub/cloud configuration depicted in FIG. 1A may exist, without departing from the invention. For example, in the monitoring system (110) that does not include an interface to the cloud (230), the functionality of the network aggregation system (120) may be performed solely on the hub (210). In such a scenario, the hub is configured to "self-backhaul". i.e., the hub may collect and consolidate sensor data and may perform some or even all of the processing that would otherwise be performed in the cloud. Similarly, in the monitoring system (110) in which the access points directly interface with the cloud (230), the functionality of the network aggregation system (120) may be performed solely in the cloud. All functionality, even functionally that would typically be provided by the hub, in this case may be provided in the cloud. The configuration of the monitoring system (110), with or without hub, in one or more embodiments of the invention, may be transparent, i.e., sensors or other devices may operate in the same manner, regardless of the presence of a hub. Similarly, a user may experience the same monitoring system, whether the hub is present or not. In one or more embodiments of the invention, the hub (210) and/or the cloud (230) perform the functionalities of the monitoring system (110), in particular of the network aggregation system (120), using the method described in reference to FIGS. 4A-4D below.

FIGS. 4A-4D shows a method flowchart for monitoring one or more mobile assets in a geographical area, in accordance with one or more embodiments of the invention. The process shown in FIGS. 4A-4D may be executed, for example, by one or more components discussed above in reference to FIGS. 1-3. One or more steps shown in FIGS. 4A-4D may be omitted, repeated, and/or performed in a different order among different embodiments of the invention. Accordingly, embodiments of the invention should not be considered limited to the specific number and arrangement of steps shown in FIGS. 4A-4D.

The method flowchart depicted in FIGS. 4A-4D may be used, for example, to track the location and/or physiological signals obtained from the mobile assets. The method flowchart may be executed repeatedly over time, thus enabling a user to continuously monitor the mobile assets and to detect changes, e.g., when the mobile assets move.

Figure 4A:
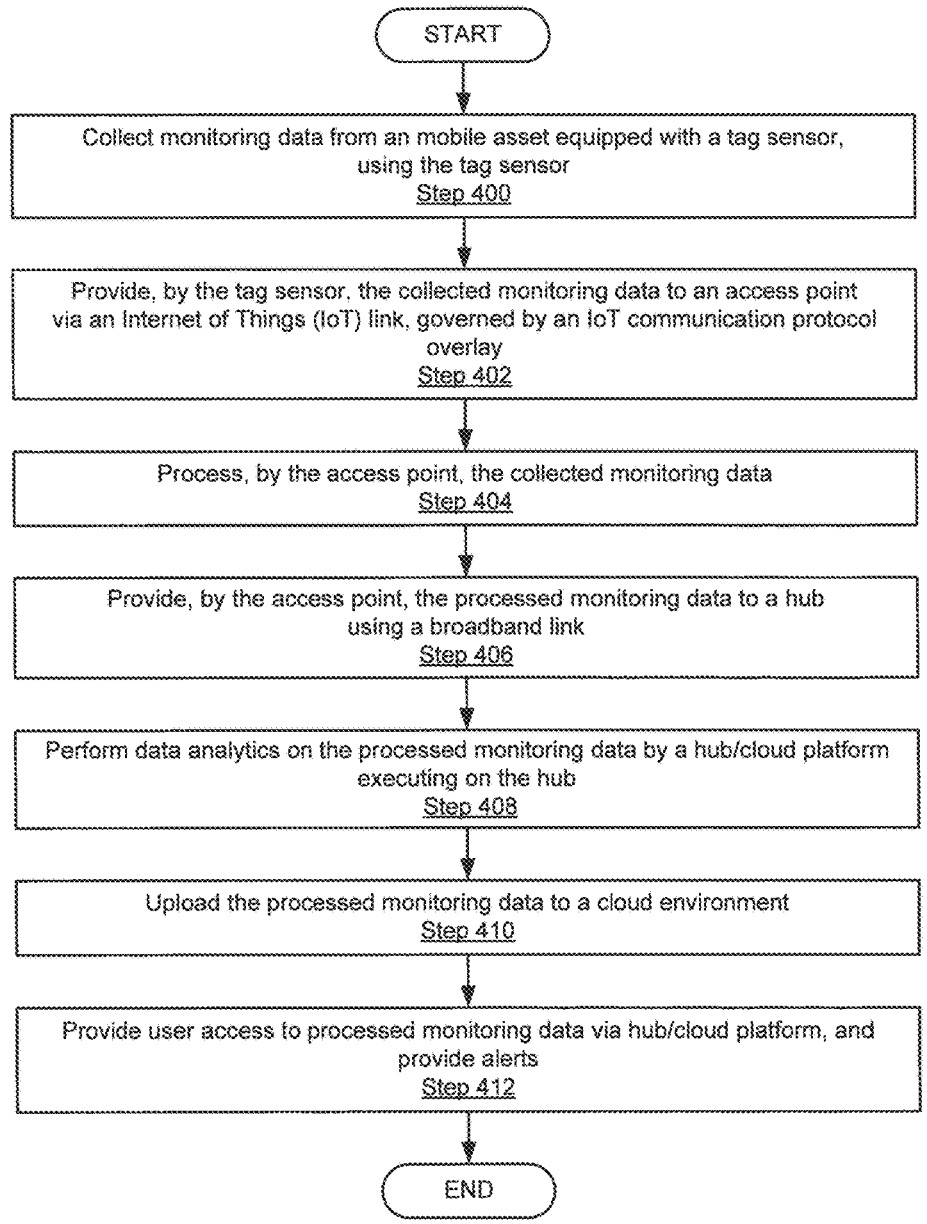
FIGS. 4A, 4B, 4C, and 4D show flowcharts of a method for monitoring a mobile asset, in accordance with one or more embodiments of the invention.

FIG. 4A shows a general method flow chart for monitoring one or more mobile assets in a geographical area. Initially in Step 400, monitoring data is collected from the mobile assets that are equipped with tag sensors. The collection may occur as scheduled, e.g., based on the timebase provided by the IoT communication protocol overlay or spontaneously, e.g., upon request or when a particular event is detected. The data collection by one tag sensor may be independent from the data collection by other tag sensors. The collected data may be buffered by the tag sensor until it can be transmitted to an access point.

In Step 402, the tag sensors provide the collected data to one or more network nodes (e.g., access points, gateways, etc.), using the IoT link. Each tag sensor uses a communication slot at a particular time and in a particular frequency band, as specified by the IoT communication protocol overlay, thus avoiding transmission interference by multiple tag sensors using the same communication slot. The transmissions of the tag sensors may be received by one or more network nodes within range.

In Step 404, the received data may be processed by the network node(s) that received the data. The processing may include aggregating, filtering, fusing, compressing and/or encrypting the data. The processing may further include the exchange of data with other access points. For example, TDOA data may be exchanged between network nodes to determine a location of a tag sensor, relative to the network nodes.

In Step 406, the processed data are provided to a hub, using the broadband link that interfaces the network node(s) and the hub. Step 406 is optional and is executed only if a hub exists in the used system configuration. If no hub exists, the processed data may alternatively be provided to the cloud. Regardless of whether the system is configured to use a hub, a cloud or both, the processed data is received by the hub/cloud application which is executing on the hub, in the cloud, or on the hub and in the cloud.

In Step 408, data analytics are performed by the application executing on the hub. The data analytics may include modules that are generic to a variety of applications such as location tracking, and other modules that are specific to a particular application, such as monitoring animals' physiological parameters. The data analytics may additionally or alternatively be performed in the cloud.

In Step 410, the processed monitoring data is uploaded to the cloud. This step may be performed in systems that include a cloud environment and in systems that include a combination of the hub and the cloud. Accordingly, data obtained from the tag sensors may be equally accessible via the cloud and via the hub.

In Step 412, a user is provided access to the processed monitoring data using a hub/cloud application that is executing on the hub, in the cloud, or on the hub and in the cloud. The user may access the processed monitoring data using any type of computing device that is capable of interfacing with the hub/cloud application. The user may obtain a visualization of the processed monitoring data, which may include text, graphics, charts, etc. The user may access a time history of the processed monitoring data and may further also access the unprocessed or partially processed data obtained from the tag sensors. Alerts may be provided to the user under certain configurable conditions. For example, an alert may be provided if a mobile asset (e.g., animal) is leaving a particular area, if unusual movement patterns (such as no movement, indicating, for example, sickness, or excessive motion, indicating, for example, a predator) are detected, of if physiological measurements are beyond a specified range.

Figure 4B:
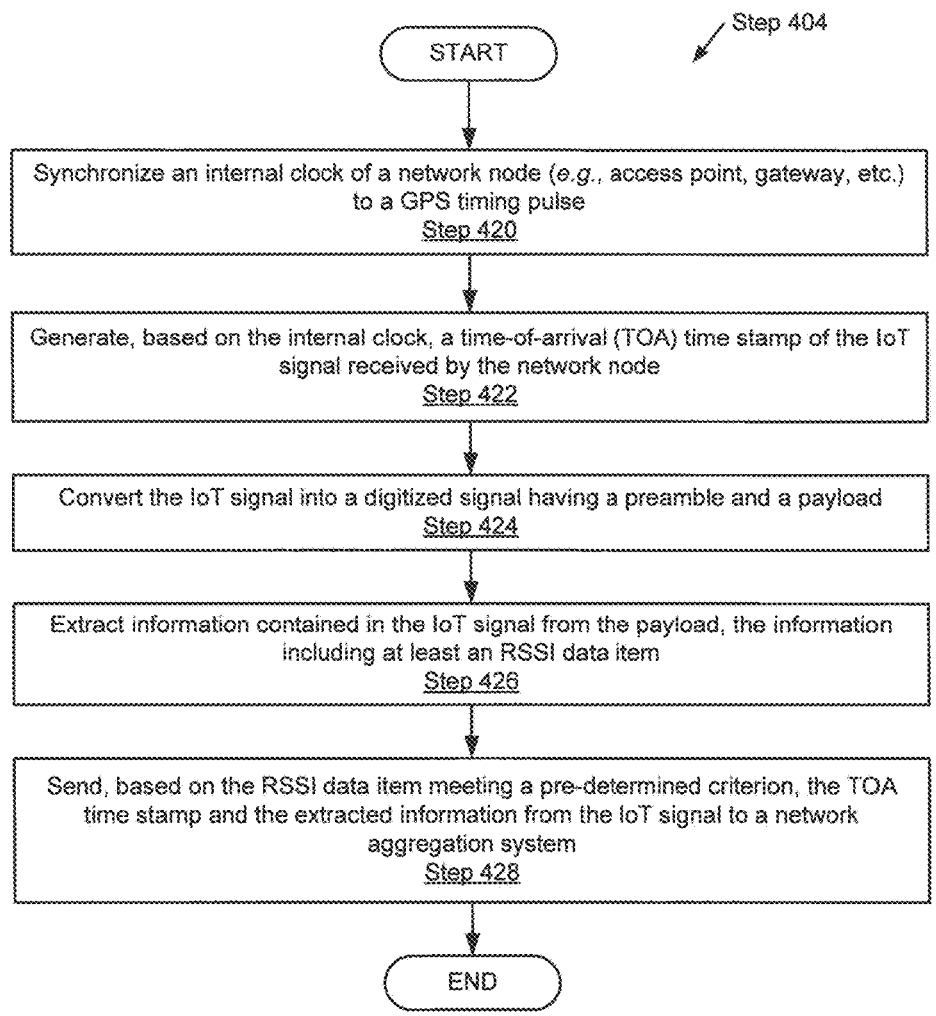

FIG. 4B shows details of Step 404, depicted in FIG. 4A above, that is performed by a network node. Initially, in Step 420, an internal clock of a network node (e.g., access point, gateway, etc.) is synchronized to a GPS timing pulse when the GPS timing pulse is available and received by the network node during at least a first time period. In response to the synchronizing, the internal clock is maintained to a pre-determined stability level throughout at least a second time period when the GPS timing pulse is unavailable and not received by the network node. In this manner, the GPS timing pulse is used to synchronize multiple network nodes of the monitoring system.

In Step 422, a time-of-arrival (TOA) time stamp of the IoT signal received by the network node is generated based on the internal clock of the network node. In one or more embodiments, the IoT signal of a single tag sensor is received by multiple network nodes that generate respective TOA time stamps based on respective internal clocks that are synchronized using the aforementioned GPS timing pulse.

In Step 424, the IoT signal is converted into a digitized signal having a preamble and a payload. In one or more embodiments, the TOA time stamp is generated based on detecting the IoT signal prior to the IoT signal being converted. In one or more embodiments, the TOA time stamp is generated based on the preamble without decoding the payload.

In Step 426, information contained in the IoT signal is extracted from the payload. In one or more embodiments, the information includes one or more of a received-signal-strength-indication (RSSI) data item, a global positioning system (GPS) position of the tag sensor, and other monitored parameters of the mobile asset. For example, the monitored parameters may include physiological parameters. In particular, the GPS position is embedded in the IoT signal by the tag sensor when GPS signal is available and received by the tag sensor.

In Step 428, the TOA time stamp and the extracted information form the IoT signal is sent to a network aggregation system. In one or more embodiments, one or more of the TOA time stamp, RSSI data item, GPS position of the tag sensor, and monitored parameters are sent to the network aggregation system via the meshed network formed by the network nodes of the monitoring system. In particular, each network node in the meshed network may relay the extracted information sent from another network node to the network aggregation system via an ad-hoc network path of the meshed network.

In one or more embodiments, sending TOA time stamp is based on the RSSI data item meeting a pre-determined criterion, which indicates acceptable quality of the received IoT signal. In other words, the network node determines that the RSSI data item meets a predetermined criterion, indicating acceptable IoT signal quality, prior to sending the TOA time stamp to the network aggregation system. If the RSSI data item of the IoT signal does not meet the pre-determined criterion, indicating unacceptable IoT signal quality, the TOA time stamp of the IoT signal is prevented from being sent to the network aggregation system.

Figure 4C:
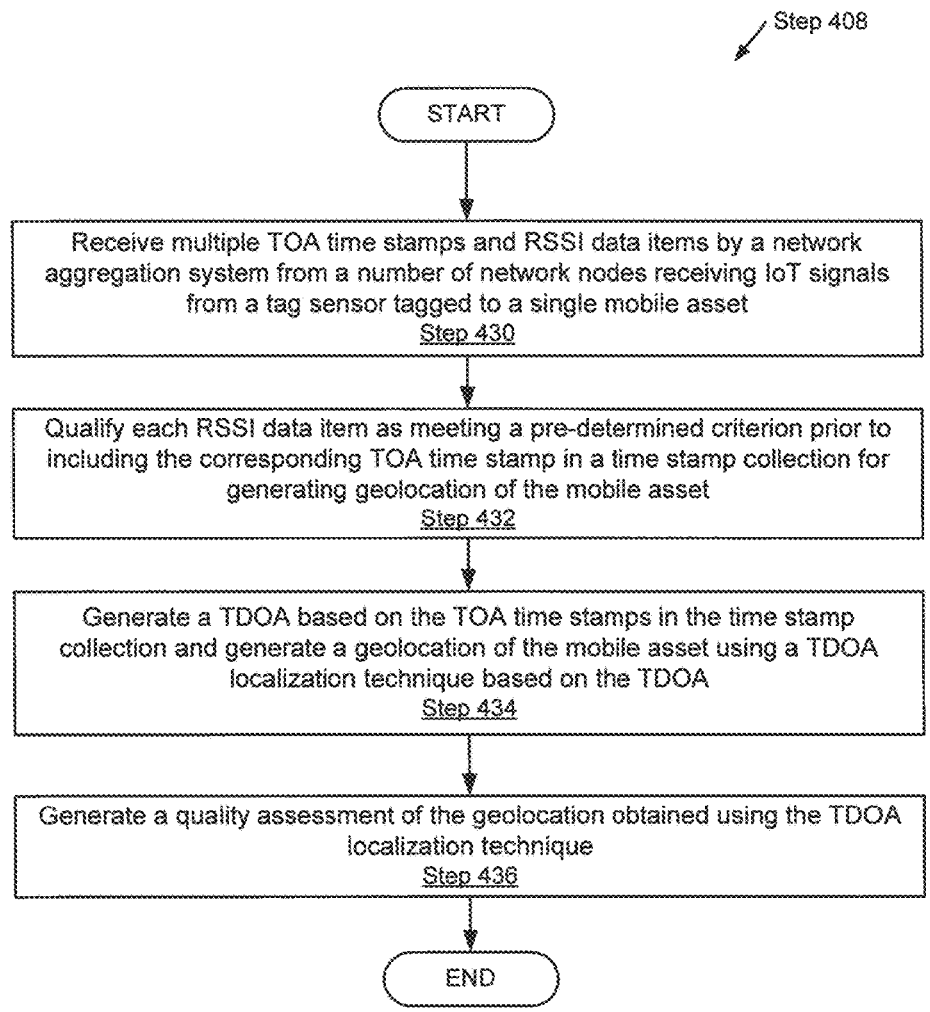

FIG. 4C shows details of Step 408, depicted in FIG. 4A above, that is performed by the network aggregation system. Initially in Step 430, multiple TOA time stamps and RSSI data items are received by a network aggregation system from a number of network nodes with known locations. In particular, the TOA time stamps and RSSI data items are generated by the network nodes from IoT signals transmitted from a tag sensor tagged to a single mobile asset. In one or more embodiments, at least one network node also transmits a GPS position of the tag sensor along with the TOA time stamp and RSSI data item. In particular, GPS position is generated by the tag sensor when a GPS signal is available and received by the tag sensor.

In Step 432, each RSSI data item is determined by the network aggregation system as meeting a pre-determined criterion, indicating acceptable quality of the received IoT signal, prior to including the corresponding TOA time stamp in a time stamp collection for generating the geolocation.

In Step 434, a geolocation of the mobile asset is generated by the network aggregation system based at least on the TOA time stamps in the time stamp collection. In one or more embodiments, the TOA time stamps in the time stamp collection are compared to each other to generate a time-difference-of-arrival (TDOA). Accordingly, the geolocation is generated from the TDOA using a pre-determined TDOA localization technique, such as based on the model described in reference to FIGS. 1B, 1C, and 1D above.

In Step 436, a quality assessment of the geolocation, generated using the TDOA localization technique, is generated. In one or more embodiments, a supplemental geolocation of the mobile asset is generated based on the RSSI data items using a pre-determined RSSI localization technique. In particular, the supplemental geolocation refers to a different calculation of geolocation to supplement the geolocation calculated using the TDOA localization technique. If the geolocation and the supplemental geolocation match each other within a pre-determined range, the geolocation generated using the TDOA localization technique is qualified. In other words, the quality assessment is positive or is assigned a higher rating. In contrast, if the difference between the geolocation and the supplemental geolocation exceeds the pre-determined range, the geolocation generated using the TDOA localization technique is disqualified. In other words, the quality assessment is negative or is assigned a lower rating.

In one or more embodiments, the GPS position of the tag sensor, when available, and the geolocation, generated using the TDOA localization technique, of the mobile asset are compared to further generate the quality assessment of monitoring the mobile asset. If the GPS position of the tag sensor, when available, and the geolocation generated using the TDOA localization technique match each other within a pre-determined range, the geolocation generated using the TDOA localization technique is qualified. In other words, the quality assessment is positive or is assigned a higher rating. In contrast, if the difference between the GPS position of the tag sensor, when available, and the geolocation generated using the TDOA localization technique exceeds the pre-determined range, the geolocation generated using the TDOA localization technique is disqualified. In other words, the quality assessment is negative or is assigned a lower rating. In one or more embodiments, if the geolocation generated using the TDOA localization technique is disqualified, the GPS position of the tag sensor, when available, and/or the supplemental geolocation generated using the predetermined RSSI localization technique are sent to the network aggregation system.

Figure 4D:
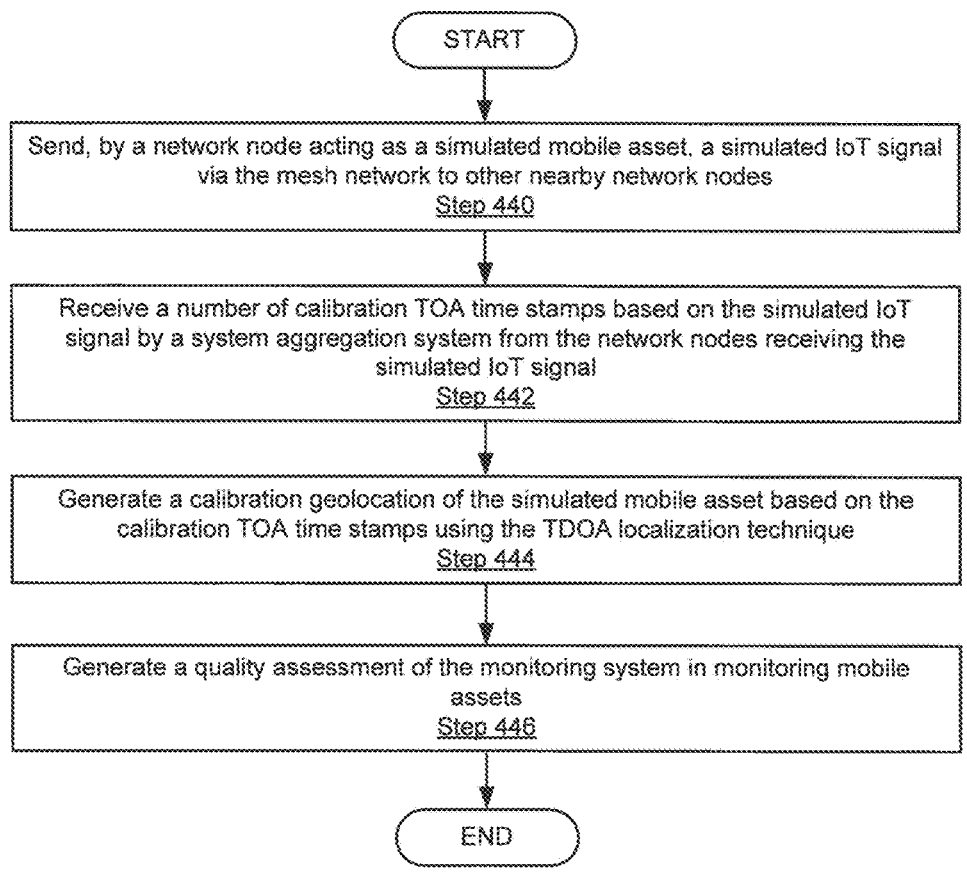

FIG. 4D shows a flow chart of a method for calibrating the monitoring system depicted in FIG. 1A above. Initially in Step 440, a simulated IoT signal is sent by a network node via the meshed network to other nearby network nodes. The simulated IoT signal includes a global positioning system (GPS) position of the network node that acts as a simulated mobile asset. In response, each of the nearby network nodes receiving the simulated IoT signal generates a calibration TOA time stamp that represents the time when the simulated IoT signal is received and detected. As used herein, the calibration TOA time stamp is a TOA time stamp generated from the simulated IoT signal for calibration purpose.

In Step 442, a number of calibration TOA time stamps based on the simulated IoT signal are received by the system aggregation system from the network nodes receiving the simulated IoT signal. In addition, the GPS position of the simulated mobile asset is also received by the system aggregation system. For example, the GPS position of the simulated mobile asset may be received directly from the network node acting as the simulated mobile asset. In another example, the GPS position of the simulated mobile asset may be received, along with the calibration TOA time stamps, from the network nodes receiving the simulated IoT signal.

In Step 444, a calibration geolocation of the simulated mobile asset is generated based on the calibration TOA time stamps using the TDOA localization technique. In particular, the calibration TOA time stamps are compared to each other to generate a TDOA based on which the calibration geolocation is generated. As used herein, the calibration geolocation is a geolocation of the simulated mobile asset that is generated for calibration purpose.

In Step 446, a quality assessment of the monitoring system in monitoring mobile assets is generated. In one or more embodiments, the GPS position of the network node acting as the simulated mobile asset and the calibration geolocation are compared to generate the quality assessment. If GPS position of the network node acting as the simulated mobile asset and the calibration geolocation match each other within a pre-determined range, the monitoring system is qualified. In other words, the quality assessment is positive or is assigned a higher rating. In contrast, if the difference between the GPS position of the network node acting as the simulated mobile asset and the calibration geolocation exceeds the predetermined range, the monitoring system is disqualified. In other words, the quality assessment is negative or is assigned a lower rating. In one or more embodiments, if the monitoring system is disqualified, the GPS position of the tag sensor, when available, and/or the supplemental geolocation generated using the predetermined RSSI localization technique are sent to the network aggregation system.

Figure 5A:
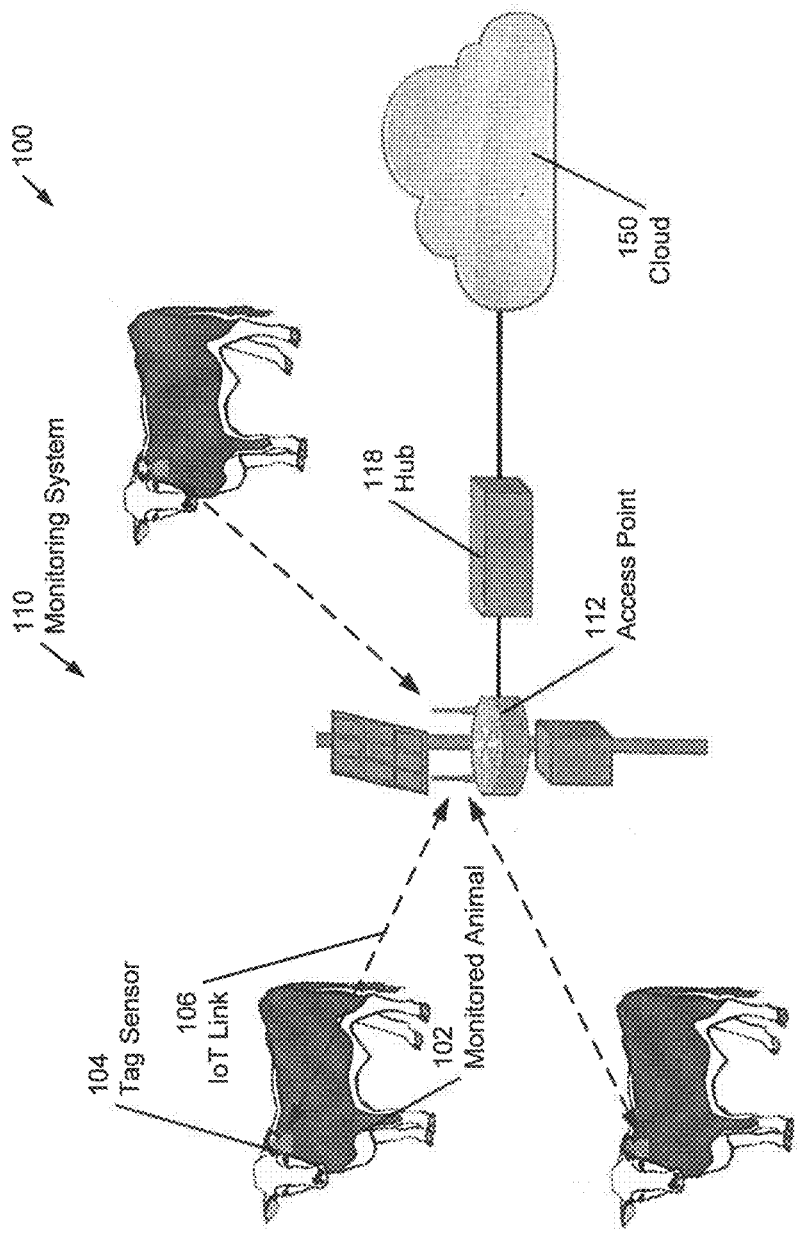
FIG. 5A shows an example of a system for monitoring a mobile asset, in accordance with one or more embodiments of the invention.

FIG. 5A shows an example of the monitoring system (110), depicted in FIG. 1A above, in accordance with one or more embodiments of the invention. In particular, FIG. 5A shows a monitoring system (110) for monitoring livestock raised in a farming environment, depicted as the geographical area (100). The farming environment may include farmland used to raise cattle, sheep, goats, or any other type of animal over a large area, such as hundreds of acres, thousands of acres, etc. In the description of FIG. 5A, the monitored animal corresponds to the mobile asset depicted in FIG. 1A above. Each monitored animal (102) is equipped with a tag sensor (104) that communicates with a network node (112) to enable monitoring of the animals. In the example shown in FIG. 5A, the network node (112) is an access point configured to communicate with the tag sensors (104) of the monitored animals (102) via an Internet of Things (IoT) (106). The access point (i.e., network node (112)) may further interface with a hub (118), which may perform processing of the data received from the monitored animals via the access points. In one or more embodiments of the invention, data gathered from the animals is uploaded to a cloud environment (150), from where they may be accessible to users. Additionally or alternatively, the data may also be locally accessible via the hub or via the access point.

Accordingly, to enable energy efficient location determination in certain regions, access points may be strategically placed to have overlapping coverage regions, thereby not requiring the use of power consuming GPS positioning. In regions where TDOA based location services are desired, a dense grid of access points with a high degree of overlap may be installed to ensure that overlapping coverage is provided by at least three access points, whereas a sparse grid of access points may be installed in other regions. In these other regions, less accurate RSSI positioning may be used, or if an accurate location is required, GPS positioning may be used.

Figure 5C:
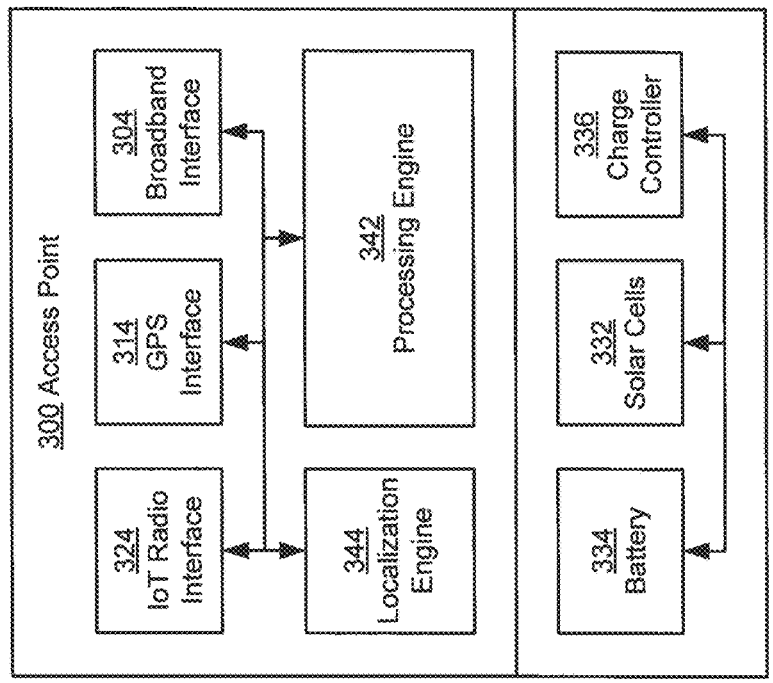
FIGS. 5B and 5C show examples of network nodes for monitoring a mobile asset, in accordance with one or more embodiments of the invention.
Figure 5B:
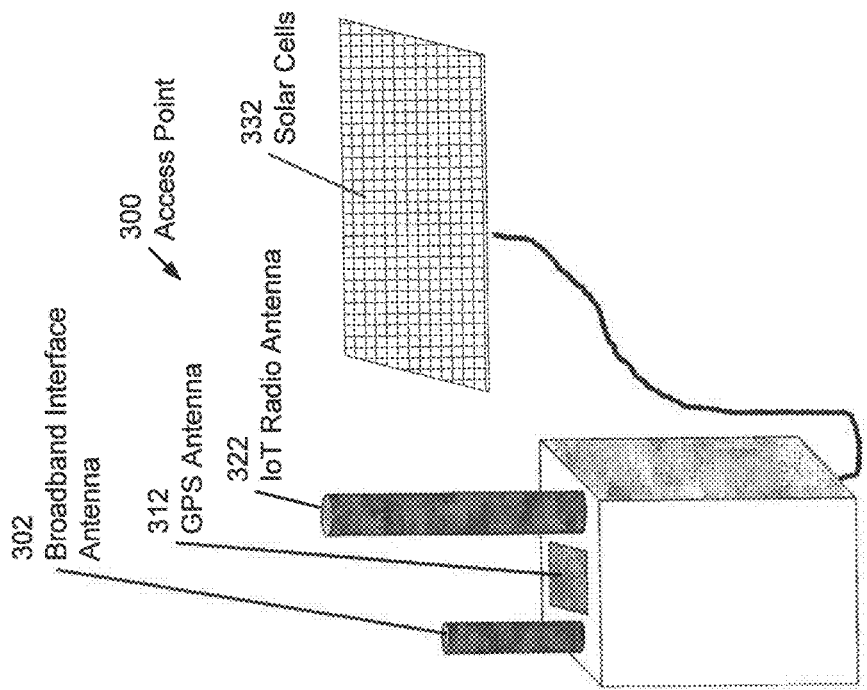

FIGS. 5B and 5C show an access point as an example network node for monitoring a mobile asset, in accordance with one or more embodiments of the invention. In FIG. 5B, the general design of an exemplary access point is shown, and in FIG. 5C, the architecture of the access point is illustrated. The exemplary access point shown in FIG. 5B includes a broadband interface antenna (302), a GPS antenna (312), an IoT radio antenna (322) and solar cells (332). As shown in FIG. 5C, the access point further includes a broadband interface (304), a GPS interlace (314) and an IoT radio interface (324).

The broadband interface (304) uses the broadband antenna (302) in order to send and receive broadband data transmissions when in contact with, e.g., other access points, as illustrated in FIG. 1A and/or with other devices such as smartphones, laptops, cameras and/or drones that are also equipped with broadband interfaces. The broadband interface may support mesh, point-to-point and multi-point connections. The broadband interface may be based on the Wi-fi standard, using, e.g., the 2.4 and/or 5 GHz radio bands. Alternatively, the broadband interface may be a cellular data interface, e.g., a 3G or 4G/LTE or 5G interface, or any other wireless data interface, without departing from the invention.

The GPS interface (314) uses the UGPS antenna (312) to obtain position signals from the global positioning system or from alternative satellite navigation services. The position signal enables the access point to accurately determine its own position. In one or more embodiments of the invention, the GPS interface further obtains an accurate time base that may be used by the access point to perform localization tasks using TDOA methods, as further described below.

The IoT radio interface (324) uses the IoT radio antenna (322) to communicate with one or more IoT devices such as the tag sensors (e.g., tag sensor (104) depicted in FIG. 1A above). The IoT interface may be based on a low power wide area network standard such as, for example, LoRa. The resulting narrowband link is particularly suitable for communications between the access point and the tag sensors or other sensors, due to its low power requirements, long range, and its ability to interface with many tag sensors and/or other devices. In one or more embodiments of the invention, the IoT radio interface (324) supports communication protocol extensions implemented on top of an existing IoT communication protocol to provide scheduled communications and timing beacons as discussed in reference to FIG. 3 above.

In one or more embodiments of the invention, the access point (300) further includes an access point processing engine (342). The access point processing engine may handle the processing of data received from devices, such as tag sensors, and may coordinate the uploading of the processed data to either the hub or to the cloud. The processing of data may involve, for example, data aggregation, data filtering, data fusion, data compression and/or data encryption.

In one or more embodiments of the invention, the access point (300) further includes a tag sensor localization engine (344). The tag sensor localization engine may be used to determine the locations of tag sensors that are within the coverage region of the access point. The localization may be performed, for example, using TDOA methods. Using the TDOA method, triangulation, based on the differences in time delay of a data transmission by a tag sensor, received by at least three access points, may be performed. The tag sensor localization engine of an access point may use this time delay information to determine the location of the tag sensor responsible for the data transmission. Because TDOA methods depend on the availability of an accurate time base to the tag sensors whose location is to be determined, communication protocol extensions that enable dissemination of an accurate time base to the tag sensors (and other sensors) via the IoT link, as discussed with reference to FIG. 3, are used by the access point. Alternatively, the tag sensor localization engine may extract the location of a tag sensor from a message provided by a sensor equipped with a GPS unit. Further, the tag sensor localization engine may also determine a location of a tag sensor based on the signal strength of a data transmission obtained from the tag sensor, using the RSSI method. Those skilled in the art will appreciate that, although the method performed by the tag sensor localization engine is described with regard to tag sensors, any device that is equipped with an IoT interface, and that is capable to communicate with the access points, may be localized by the tag sensor localization engine.

The access point processing engine (342) and the tag sensor localization engine (344) may be software executing on a computing device (not shown) of the access point (300). The computing device of the hub may be, for example, an embedded system that includes all components of the computing device on a single printed circuit board (PCB), or a system on a chip (SOC), i.e., an integrated circuit (IC) that integrates all components of the computing device into a single chip. The computing device may include one or more processor cores, associated memory (e.g., random access memory (RAM), cache memory, flash memory, etc.), and interfaces to storage devices, input and output devices, etc. The computing device may further include one or more storage device(s) (e.g., a hard disk, an optical drive such as a compact disk (CD) drive or digital versatile disk (DVD) drive, flash memory, etc.), and numerous other elements and functionalities. In one embodiment of the invention, the computing device includes an operating system that may include functionality to execute the methods further described below. Those skilled in the art will appreciate that the invention is not limited to the aforementioned configuration of the computing device.

In one or more embodiments of the invention, the access point further includes a power system that may include the solar cells (332), a battery (334) and a charge controller (336), powering the access point, The battery may be deep-cycle capable to guarantee continued operation at night or under cloudy conditions when power provided by the solar cells is insufficient. The solar cells may he dimensioned to enable powering the access point while also recharging the battery. Alternatively, the access point may be powered externally, e.g., using power over Ethernet (PoE) or using a dedicated power input. The charge controller in combination with the access point processing engine (342) may provide charging, battery status and power consumption analytics, enabling power management of the access point. A direct current (DC) power and data over DC power link may be used to power the access point by the power system, but also to enable the charge controller to communicate status information (such as battery level, temperature, etc.) to the access point.

Various embodiments of the invention have one or more of the following advantages. Embodiments of the invention enable comprehensive monitoring of one or more mobile assets, such as farm animals. The monitoring may include monitoring of animal location, animal behavior and/or animal physiology. The coverage provided by the monitoring system, in accordance with one or more embodiments of the invention, is scalable, from, e.g., tens of acres to tens of thousands of acres. The number of animals being monitored by the system for monitoring livestock, in accordance with one or more embodiments of the invention, is scalable, e.g., from hundreds of animals to hundreds of thousands of animals.

FIG. 6 shows a computing system in accordance with one or more embodiments of the invention. Embodiments of the invention may be implemented on a computing system. Any combination of mobile, desktop, server, embedded, or other types of hardware may be used. For example, as shown in FIG. 6, the computing system (600) may include one or more computer processor(s) (602), associated memory (604) random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the invention.

Further, one or more elements of the aforementioned computing system (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Embodiments of the invention may enable, for example, the implementation of geo-fencing flinctionalities to prevent escape or to detect proximity to hazardous features such as cliffs. Embodiments of the invention may further enable the detection of regular use (or failure to use) feed or water locations, rapid movements (resulting, e.g., from a predator attack), and/or failure to move (resulting, e.g., from injury). Further additional behaviors may be detected using additional sensors. For example, an accelerometer may be used to detect head motion that is characteristic for eating and drinking. Physiological variables may he monitored, including temperature, heart rate, blood pressure and digestive activity to monitor animal health. Alerts may be triggered when any one or combinations of measurements are beyond a specified range, thus enabling early detection of threats, diseases and other anomalies.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A network node for monitoring a mobile asset in a geographical area, comprising:
   an Internet-of-things (IoT) receiver configured to receive an IoT signal from a tag sensor disposed on the mobile asset;
   a time-of-arrival (TOA) module coupled to the IoT receiver and configured to generate a time stamp representing a TOA of the IoT signal as received by the TOA module; and
   a processing engine coupled to the IoT receiver and the TOA module and configured to:
      extract an RSSI data item embedded in the IoT signal; and
      transmit the time stamp and the RSSI data item,
   wherein the network node is one of a plurality of network nodes disposed in the geographical area, the plurality of network nodes being configured to:
      receive the IoT signal from the mobile asset; and
      send a plurality of time stamps, including the time stamp, generated by the plurality of network nodes based on the IoT signal to a network aggregation system,
   wherein a time-difference-of-arrival (TDOA) is generated based on the plurality of time stamps,
   wherein a geolocation of the mobile asset is obtained based at least on the TDOA, and p1 wherein the geolocation is qualified using at least the RSSI data item.

2. The network node of claim 1,
   wherein the IoT receiver is further configured to convert the IoT signal into a digitized signal comprising a preamble and a payload,
   wherein the TOA module generates the time stamp based on the preamble without decoding the payload, and
   wherein the processing engine extracts the RSSI data item from the payload.

3. The network node of claim 1, further comprising:
a signal conditioning circuit configured to synchronize an internal clock to a global positioning system (GPS) timing pulse,
wherein the TOA module generates the time stamp based on the internal clock,
wherein the GPS timing pulse, when available during at least a first time period, is used by the plurality of network nodes to synchronize the plurality of time stamps, and
wherein the signal conditioning circuit is further configured to maintain a pre-determined stability level of the internal clock throughout at least a second time period when the GPS timing pulse is unavailable.

4. The network node of claim 1, wherein qualifying the geolocation using at least the RSSI data item comprises at least one selected from a group consisting of:
determining, by the network node, that the RSSI data item meets a pre-determined criterion prior to transmitting the time stamp to the network aggregation system; and
determining, by the network aggregation system, that the RSSI data item meets the pre-determined criterion prior to including the time stamp in the plurality of time stamps for generating the geolocation.

5. The network node of claim 1, wherein
the plurality of network nodes receiving the IoT signal send a plurality of RSSI data items generated by the plurality of network nodes based on the IoT signal to the network aggregation system, wherein the plurality of RSSI data items comprise the RSSI data item,
wherein qualifying the geolocation using at least the RSSI data item comprises:
generating, by the network aggregation system, a supplemental geolocation of the mobile asset based at least on the plurality of RSSI data items; and
determining that the geolocation and the supplemental geolocation matches each other within a pre-determined range.

6. The network node of claim 5,
wherein the processing engine transmits the time stamp and the RSSI data item to the network aggregation system via a mesh network formed by at least the plurality of network nodes,
wherein the processing engine is further configured to relay, from a portion of the plurality of network nodes to the network aggregation system via the mesh network, a first corresponding portion of the plurality of time stamps and a second corresponding portion of the plurality of RSSI data items, and
wherein the network aggregation system comprises at least one selected from a group consisting of a network hub and a cloud server.

7. The network node of claim 6, wherein the network node is further configured to:
send, via the mesh network to the portion of the plurality of network nodes, a simulated IoT signal comprising a global positioning system (GPS) position of the network node, wherein the network node acts as a simulated mobile asset,
wherein the network aggregation system is further configured to:
receive, from the portion of the plurality of network nodes receiving the simulated IoT signal, a plurality of calibration time stamps based on the simulated IoT signal;
generate a calibration geolocation of the simulated mobile asset based at least on the plurality of calibration time stamps; and
compare the GPS position from the network node and the calibration geolocation to generate a quality assessment of monitoring the mobile asset.

8. The network node of claim 1, wherein the network node is further configured to:
extract, from the IoT signal for sending to the network aggregation system, a global positioning system (GPS) position of the tag sensor during at least a time period when the GPS position is available from the IoT signal,
wherein the network aggregation system is further configured to:
compare the GPS position of the tag sensor received from the network node and the geolocation of the mobile asset to generate a quality assessment of monitoring the mobile asset.

9. The network node of claim 1, wherein the RSSI data item represents a signal-to-noise-ratio (SNR) of the IoT signal.

10. The network node of claim 1, wherein generating the geolocation of the mobile asset based at least on the plurality of time stamps comprises at least one selected from a group consisting of applying a first geolocation generation algorithm to three time stamps of the plurality of the time stamps and applying a second geolocation generation algorithm to four or more time stamps of the plurality of the time stamps.

11. The network node of claim 10, wherein the first geolocation generation algorithm is selected for generating the geolocation of the mobile asset using the three time stamps when a remainder portion of the plurality of time stamps is disqualified based on corresponding RSSI data items.

12. The network node of claim 2, wherein monitoring the mobile asset comprises extracting, from the payload, a monitored parameter of the mobile asset for sending to the network aggregation system.

13. A network aggregation system for monitoring a mobile asset in a geographical area, comprising:
a computer processor; and
memory storing instructions, when executed, causing the computer processor to:
receive, from a plurality of network nodes disposed about the geographical area to receive an Internet-of-things (IoT) signal from a tag sensor disposed on the mobile asset, a plurality of time stamps each representing a time-of-arrival (TOA) of the IoT signal as received by a corresponding one of the plurality of network nodes;
generate a time-difference-of-arrival (TDOA) based on the plurality of time stamps; and
generate a geolocation of the mobile asset based at least on the TDOA,
wherein a network node of the plurality of network nodes is configured to:
receive the IoT signal from the tag sensor;
generate a time stamp of the plurality of time stamps for the IoT signal;
extract an received-signal-strength-indication (RSSI) data item embedded in the IoT signal; and
send the time stamp and the RSSI data item to the network aggregation system, and
wherein the geolocation is qualified using at least the RSSI data item.

14. The network aggregation system of claim 13, wherein qualifying the geolocation using at least the RSSI data item comprises at least one selected from a group consisting of:
  determining, by the network node, that the RSSI data item meets a pre-determined criterion prior to sending the time stamp to the network aggregation system; and
  determining, by the network aggregation system, that the RSSI data item meets the pre-determined criterion prior to including the time stamp in the plurality of time stamps for generating the geolocation.

15. The network aggregation system of claim 13, wherein the instructions, when executed, further causing the computer processor to:
  receive, from the plurality of network nodes receiving the IoT signal, a plurality of RSSI data items generated by the plurality of network nodes based on the IoT signal, wherein the plurality of RSSI data items comprise the RSSI data item;
  generate a supplemental geolocation of the mobile asset based at least on the plurality of RSSI data items; and
  determine that the geolocation and the supplemental geolocation matches each other within a pre-determined range to qualify the geolocation.

16. The network aggregation system of claim 13,
  wherein the plurality of time stamps and the plurality of RSSI data items are received via a mesh network formed by at least the plurality of network nodes, and
  wherein the computer processor is comprised in at least one selected from a group consisting of a network hub and a cloud server.

17. The network aggregation system of claim 13, wherein the instructions, when executed, further causing the computer processor to:
  receive, from a portion of the plurality of network nodes receiving a simulated IoT signal sent from the network node, a plurality of calibration time stamps based on the simulated IoT signal, wherein the simulated IoT signal comprises a global positioning system (GPS) position of the network node, wherein the network node acts as a simulated mobile asset;
  generate a calibration geolocation of the simulated mobile asset based at least on the plurality of calibration time stamps; and
  compare the GPS position from the network node and the calibration geolocation to generate a quality assessment of monitoring the mobile asset.

18. The network aggregation system of claim 13, wherein the instructions, when executed, further causing the computer processor to:
  compare a global positioning system (GPS) position of the tag sensor received from the network node and the geolocation of the mobile asset to generate a quality assessment of monitoring the mobile asset,
  wherein the GPS position of the tag sensor is extracted from the IoT signal by the network node during at least a time period when the GPS position is available from the IoT signal.

19. The network aggregation system of claim 13, wherein generating the geolocation of the mobile asset based at least on the plurality of time stamps comprises at least one selected from a group consisting of applying a first geolocation generation algorithm to three time stamps of the plurality of the time stamps and applying a second geolocation generation algorithm to four or more time stamps of the plurality of the time stamps.

20. The network aggregation system of claim 19, wherein the first geolocation generation algorithm is selected for generating the geolocation of the mobile asset using the three time stamps when a remainder portion of the plurality of time stamps is disqualified based on corresponding RSSI data items.

21. The network aggregation system of claim 14, wherein monitoring the mobile asset comprises extracting, from a payload, a monitored parameter of the mobile asset for sending to the network aggregation system.

22. A method for monitoring a mobile asset in a geographical area, comprising:
  receiving, by a network node of a plurality of network nodes disposed within the geographical area to receive an Internet-of-things (IoT) signal, the IoT signal from a tag sensor disposed on the mobile asset;
  generating, by the network node, a time stamp of the IoT signal among a plurality of time stamps generated by the plurality of network nodes based on the IoT signal;
  extracting, by the network node, a received-signal-strength-indication (RSSI) data item embedded in the IoT signal; and
  sending, by the plurality of network nodes, the plurality of time stamps and at least the RSSI data item to a network aggregation system,
  wherein a time-difference-of-arrival (TDOA) is generated based on the plurality of time stamps,
  wherein a geolocation of the mobile asset is obtained based at least on the TDOA, and
  wherein the geolocation is qualified using at least the RSSI data item.

23. The method of claim 22, further comprising:
  converting the IoT signal into a digitized signal comprising a preamble and a payload,
  wherein the time stamp is generated based on the preamble without decoding the payload, and
  wherein the RSSI data item is extracted from the payload.

24. The method of claim 22, further comprising:
  synchronizing, when a global positioning system (GPS) timing pulse is available during at least a first time period, an internal clock of the network device to the GPS timing pulse; and
  maintaining, in response to the synchronizing, a pre-determined stability level of the internal clock throughout at least a second time period when the GPS timing pulse is unavailable,
  wherein the time stamp is generated further based on the internal clock, and
  wherein the GPS timing pulse is used by the plurality of network nodes to synchronize the plurality of time stamps during at least the first time period.

25. The method of claim 22, wherein qualifying the geolocation using at least the RSSI data item comprises at least one selected from a group consisting of:
  determining, by the network node, that the RSSI data item meets a pre-determined criterion prior to sending the time stamp to the network aggregation system; and
  determining, by the network aggregation system, that the RSSI data item meets the pre-determined criterion prior to including the time stamp in the plurality of time stamps for generating the geolocation.

26. The method of claim 22, further comprising:
  receiving, by the network aggregation system from the plurality of network nodes receiving the IoT signal, a plurality of RSSI data items generated by the plurality of network nodes based on the IoT signal, wherein the plurality of RSSI data items comprise the RSSI data item, wherein qualifying the geolocation using at least the RSSI data item comprises:
  generating, by the network aggregation system, a supplemental geolocation of the mobile asset based at least on the plurality of RSSI data items; and
  determining that the geolocation and the supplemental geolocation matches each other within a pre-determined range.

27. The method of claim 26, further comprising:
relaying, by the network node from a portion of the plurality of network nodes via a mesh network, a first corresponding portion of the plurality of time stamps and a second corresponding portion of the plurality of RSSI data items to the network aggregation system,
wherein the mesh network is formed by at least the plurality of network nodes, and
wherein the network aggregation system comprises at least one selected from a group consisting of a network hub and a cloud server.

28. The method of claim 27, further comprising:
sending, by the network node via the mesh network to the portion of the plurality of network nodes, a simulated IoT signal comprising a global positioning system (GPS) position of the network node, wherein the network node acts as a simulated mobile asset;
receiving, from the portion of the plurality of network nodes receiving the simulated IoT signal, a plurality of calibration time stamps based on the simulated IoT signal;
generating a calibration geolocation of the simulated mobile asset based at least on the plurality of calibration time stamps; and
comparing the GPS position from the network node and the calibration geolocation to generate a quality assessment of monitoring the mobile asset.

29. The method of claim 22, further comprising:
extracting, from the IoT signal for sending to the network aggregation system, a global positioning system (GPS) position of the tag sensor during at least a time period when the GPS position is available from the IoT signal; and
comparing the GPS position of the tag sensor received from the network node and the geolocation of the mobile asset to generate a quality assessment of monitoring the mobile asset.

30. The method of claim 23, further comprising:
extracting, by the network node from a payload, a monitored parameter of the mobile asset for sending to the network aggregation system.

* * * * *